United States Patent [19]
Bissell et al.

[11] 3,847,445

[45] Nov. 12, 1974

[54] AIRCRAFT AUTOMATIC BRAKING SYSTEM HAVING AUTO-BRAKE CONTROL LOGIC

[75] Inventors: Sherman M. Bissell; Garrett H. De Vlieg, both of Bellevue; Johan N. Hopland, Renton, all of Wash.

[73] Assignee: The Boeing Company, Seattle, Wash.

[22] Filed: Nov. 12, 1973

[21] Appl. No.: 415,058

[52] U.S. Cl............................. 303/21 AF, 244/111
[51] Int. Cl............................................... B60t 8/08
[58] Field of Search ................ 244/111; 303/20, 21

[56] References Cited
UNITED STATES PATENTS

| | | | |
|---|---|---|---|
| 3,017,145 | 1/1962 | Yarber............................. | 244/111 |
| 3,245,213 | 4/1966 | Thompson et al............. | 303/21 EB |
| 3,275,384 | 9/1966 | Hirzel ............................. | 303/21 EB |
| 3,520,575 | 7/1970 | Steigerwald.................... | 303/21 BE |
| 3,545,817 | 12/1970 | Yarber ............................. | 303/21 P |
| 3,711,163 | 1/1973 | Booher............................. | 303/21 P |

Primary Examiner—Trygve M. Blix
Assistant Examiner—Stephen G. Kunin
Attorney, Agent, or Firm—Conrad O. Gardner; Glenn Orlob

[57] ABSTRACT

An aircraft automatic braking system having auto-brake logic commanding three electromechincal relays. The logic functions to control arm/disarm, detect wheel spin-up, command brake application (on-ramp) at touchdown, and detect auto-brake faults. Redundancy and design isolation are provided to insure that no single auto-brake failure causing early brake application or insufficient aircraft deceleration can occur without pilot indication.

6 Claims, 10 Drawing Figures

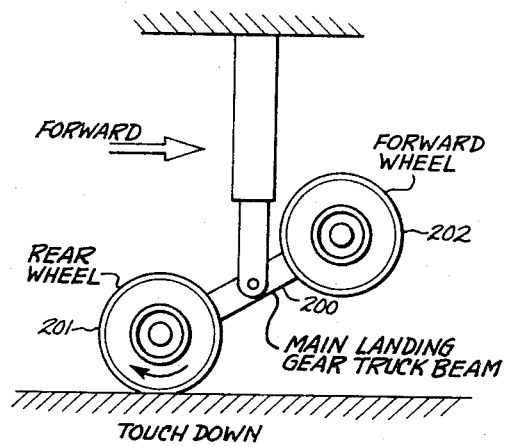
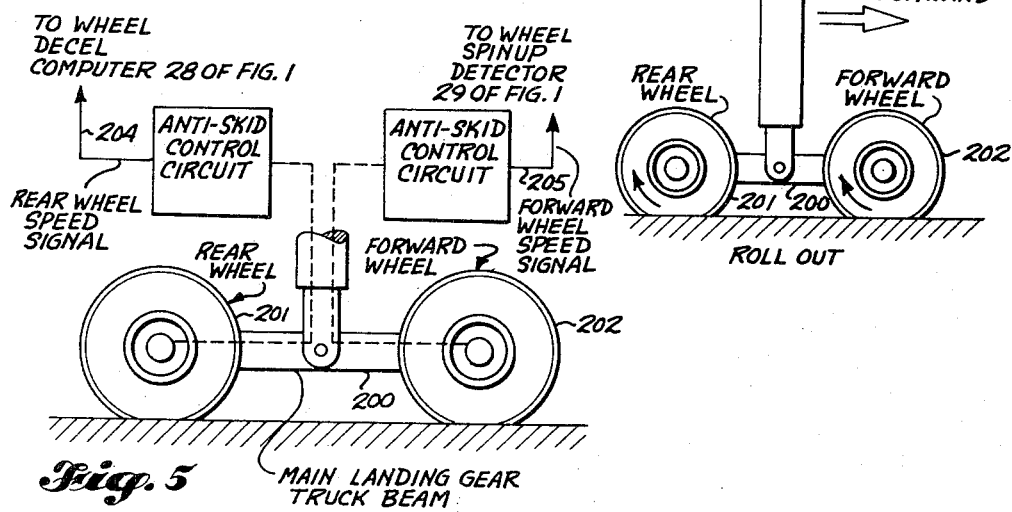
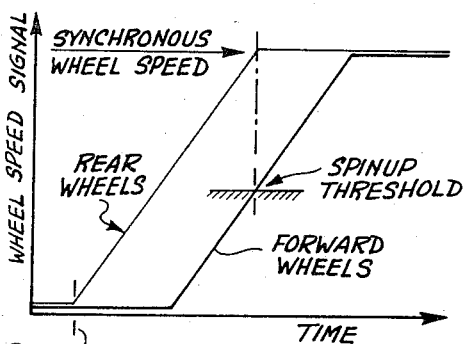

AIRCRAFT AUTOMATIC BRAKING SYSTEM HAVING AUTO-BRAKE CONTROL LOGIC

This invention relates to automatic braking systems for aircraft and more particularly to an automatic braking system having auto-brake control logic. A system utilizing the present auto-brake control logic has a single control valve which meters braking pressure to the shuttle valves (one for each side of the aircraft). The pressure is then passed through the shuttle valve to the metered brake pressure line. The single control valve assures equal braking on all wheels, and the two shuttle valves permit the pilot to instantly override automatic braking at all times. Normal anti-skid control is retained and hydraulic pressure modulation rates are controlled so that smooth braking is realized and anti-skid efficiency optimized. An orifice in the automatic braking system hydraulic return line is sized to assure smooth release of automatic braking not dependent upon electrically generated off ramp control signal generating circuits as shown in the system of application Ser, No. 200,092 filed Nov. 18, 1971, now abandoned, by Glasenapp et al which application is assigned to the assignee of the present application. The present automatic braking system further permits braking only when the system control logic is satisfied.

The importance of avoiding possible runway overrun by prompt brake application after touchdown has been recognized earlier in the aforementioned patent application wherein an automatic braking system for reducing the probability of such incidents occurring was provided by automatically applying wheel braking and decelerating the aircraft at a predetermined rate of deceleration.

A feature of the present system is the utilization of the average of a plurality of forward wheels on aircraft landing gear trucks to provide logic information signals to the system control logic circuits which provide the turn on and turn off logic for the automatic braking system. D. C. wheelspeed signals developed for anti-skid circuit control are processed to provide turn on logic and also processed to provide pressure control in the control channel.

The present system provides means for averaging a plurality of wheelspeed signals developed from transducers on a respective plurality of rear wheels of the landing gear trucks with subsequent signal processing including differentiaion, filtering and limiting to provide signals which are then compared to signals representative of selected deceleration to provide an initial commanded deceleration level at least several times the selected deceleration level (e.g. 5 times) with consequent decay in commanded deceleration level to the selected value in a predetermined time period e.g. one-third second. The error signal is subsequently limited to (nominally) plus or minus 500 psi per second, then coupled through integrator and limiter circuit means further limiting to (nominally) 1800 and 300 psi. The brake pressure control signal thus developed in the control channel is then coupled to power amplifier means and the amplified brake pressure control signal is then coupled to the automatic brake pressure modulating valve means.

The valve means in accordance with an embodiment of the invention is mounted in a valve module with an upstream solenoid shutoff valve and two pressure switches. The valve means meters the automatic braking pressure to two shuttle valves, one for the brakes on the respective sides of the aircraft. The pressure is transmitted through the shuttle valves and the anti-skid valves to the brakes, unless the pilot's metered pressure exceeds and overrides the auto-brake pressure at the shuttle valve. To avoid degrading anti-skid braking efficiency and to further insure smooth braking, the aforementioned rate limits (plus or minus 500 psi/sec nominal) are provided to prevent rapid pressure variations. A further important feature of the present automatic system is the arrangement of an orifice in the auto-brake valve module return line to cause auto-brake (automatic braking) pressure to be released smoothly and rapidly when shut off.

The automatic braking system in the aforementioned application to Glasenapp et al requires that auto-brakes must be both hydraulically and electrically disconnected to permit manual braking override. Also two pressure comparators (hydraulic differential pressure switches) are added, in addition to the two switches per brake pedal, to sense when the pilot's metered pressure equals braking pressure then shutting off the auto-brakes. In the Glasenapp et al system, some passenger jolt occurs during transition from automatic to manual braking since when one side of the aircraft senses transition by the pressure comparator then both sides of the aircraft lose auto-brakes.

The above mentioned disadvantages of the Glasenapp et al. system are overcome in the present system in which automatic braking pressure is regulated by the pressure control valve in the auto-brake module. This pressure is transmitted through one shuttle valve on each side of the aircraft and into the metered pressure line. Metered pressure switches may be utilized to replace the switches on the pilot's pedals. The auto-brake valve module may according to an embodiment of the present system include in series path a solenoid valve, a pressure switch, a pressure control valve, and a further switch. The solenoid valve turns hydraulic power on in the auto-brake system, and the pressure control valve in the series path regulates auto-brake pressure. Pressure switches for logic detection of critical failures may be included in the series path. The present system utilizes less components than the aforementioned Glasenapp system and provides simplified and improved auto-brake control.

Accordingly the present automatic braking system provides the following features of advantages:

1. Provision for manual braking override of auto-braking even if the auto-brakes remain in the on condition both electrically and/or hydraulically.
2. A system design not requiring the utilization of pressure comparators.
3. The assurance of substantially equal braking on all wheels, independent of anti-skid valve tolerances or valve calibration drift.
4. Minimization of passenger jolt during auto-to-manual reversion of each side of the aircraft separately.
5. Exclusion of anti-skid control commands from the auto-brake command control path.
6. Elimination of electrical failures as a cause of assymetric braking.
7. Prevention of degradation of anti-skid braking efficiency during auto-braking.

A further feature of the present system is the utilization of a deceleration overshoot command to insure pilot feel of braking at touchdown.

Yet a further feature of the present system comprises the utilization of limiting circuit means in the automatic brake pressure control signal channel for limiting the rate of change of auto-brake pressure command to (nominally plus or minus 500 psi/sec) give smooth brake modulation.

Another feature of the present system comprises the averaging of a plurality of rear truck wheel D. C. level wheelspreed signals (such as those developed for and utilized in anti-skid signal processing) for development of signals representative of deceleration and the utilization of front truck wheel D. C. level wheelspeed signals for coupling to spin-up detection logic to insure that the deceleration measuring rear wheel signals are fully spun up by the time the spin-detecting wheels pass the spin-up detection threshold.

In accordance with a feature of the present invention the auto-brake control logic includes Arm/Disarm logic. Two separate circuits provide redudant disarm and indication. The primary circuit, which operates the first relay, interrupts holding power to the overhead selector switch when a disarm signal is detected. This action releases auto-brake pressure and causes the overhead selector switch to fall to the DISARM position and light the AUTO-BRAKE light. The secondary circuit, which operates the second relay, interrupts the power to the third relay (ON-RAMP relay) when a disarm signal is detected. This action releases auto-brake pressure and sends a turn-on signal to the AUTO-BRAKE light through the overhead Selector Switch, If the primary disarm circuit fails to cause the overhead selector switch to fall to the disarm position, the secondary circuit will release pressure and light to light. However, the secondary circuit does not interrupt holding power to the Overhead Selector Switch. The input logic to the primary and secondary arming circuits is identical except that the primary circuit uses primary air/ground mode and the secondary circuit uses alternate air/ground mode. Any one of the following conditions will disarm (or prevent arming of) the auto-brakes:

Throttle No. 1 or No. 3 advanced to takeoff range with aircraft on ground.
Left or right pedal braking effort greater than 1000 psi.
Anti-skid fault or power loss.
Auto-brake fault or power loss.

In accordance with a further feature of the present invention, the auto-brake control logic includes spinup detectors. Two separate and identical detectors compute redundant SPINUP signals from the eight forward anti-skid wheel speed inputs. Each forward wheelspeed signals is fed to both spinup detectors. To prevent random wheelspeed signals from continually turning SPINUP on and off, a forty knot hysteresis is built into each detector. The A-SPINUP detector provides logic for brake application (ON-RAMP circuit), and the B-SPINUP detector provides logic for the fault monitor.

In accordance with another feature of the present invention, the auto-brake control logic includes brake application logic (ON-RAMP). If both the primary and secondary arming circuits are holding auto-brakes armed, then the ON-RAMP circuit can close the third relay. This causes brake pressure application by opening the solenoid shutoff valve and enabling the deceleration control circuit and pressure control valve to regulate auto-brake pressure. The ON-RAMP signal occurs when the primary air ground system indicates "ground mode" and the A-SPINUP circuit indicates SPINUP. After the ON-RAMP has held "on" for three seconds, a latch actuates, which allows the SPINUP signal to disappear without releasing the ON-RAMP, provided the airplane stays in the ground mode. If the airplane bounces into the air, the ON-RAMP shuts off, and the SPINUP latch resets. Note that the system does not disarm, but remains armed and ready for the next touchdown. When the next touchdown occurs, both ground mode and A-SPINUP are required to reapply pressure and a full three second ON-RAMP is again required to reactuate the latch. Once the latch is activated and ground mode is maintained, the auto-brake pressure will remain on until the pilot disarms the system.

In accordance with another feature of the present invention the auto-brake control logic includes fault monitor logic. The fault monitor logic continuously monitors key points in the auto-brake system and disarms the system through both the primary and secondary arming circuits when a fault is detected. The logic inputs to the fault monitor are:

alternate air/ground mode
B-SPINUP
low deceleration monitor (from control circuit)
solenoid pressure switch
Control pressure switch When a fault condition occurs it does not disarm the system immediately, since during normal operation some fault conditions will occur for short durations. However, if a fault condition lasts for 3 seconds, a fault is detected and latched on, and a disarm signal is sent to the disarm circuits. The fault will not unlatch until arming power is lost. The fault monitor is designed to detect three basic system faults: (1) A- and B-SPINUP or SPINUP latch disagreement, (2) "A" and "B" ON-RAMP disagreement, and (3) control system faults causing insufficient airplane deceleration. Any failure that may apply brakes too early or fails to apply sufficient braking during landing is detected by one of these three fault monitors.

With regard to A- and B-SPINUP or SPINUP latch disagreement, the fault monitor logic contains a duplicate ON-RAMP circuit which computes a redundant or "B" ON-RAMP signal. This signal is computed from "B"-SPIN-UP and alternate air/ground logic, rather than the normal or "A"ON-RAMP circuit which uses A-SPINUP and primary air/ground logic. The "SPIN-UP" or SPIN-UP latch signals from the A and B circuits are compared for disagreement. If a disagreement occurs, then a fault condition is indicated. If the fault condition lasts for 3 seconds, an auto-brake fault is detected and the system disarms. When auto-brakes are armed in the air prior to touchdown, and one "SPIN-UP or SPIN-UP latch" signal has failed "on," a disagreement is detected which disarms auto-brakes after 3 seconds. Such a fault either indicates possible early brake application (A-SPIN-UP on), or failure of the B-SPIN-UP fault detector (B-SPIN-UP on). After touchdown, if one of the "SPIN-UP or SPIN-UP latch" signals fails to turn on, a disagreement is detected which disarms auto-brakes after 3 seconds. Such a fault either indicates a failure of auto-brakes to apply at touchdown (no A-SPIN-UP) or failure of the B-SPIN-UP fault detector (no B-SPIN-UP).

In the case of A AND B ON-RAMP disagreement, the B ON-RAMP circuit generates a redundant B ON-RAMP signal (based upon B-SPIN-UP and alternate air/ground mode) which passes through an inverter to change its sign. This signal is then compared to the A ON-RAMP as detected by the solenoid pressure switch. If the system is working properly then the A ON-RAMP (solenoid pressure switch) should agree with the B ON-RAMP (inverter output) at all times. If not, a fault condition exists, and if it lasts for 3 seconds, an auto-brake fault is detected and the system disarms. When the auto-brakes are armed in the air prior to touchdown, and either the solenoid pressure or B ON-RAMP has failed "on," a disagreement is detected which disarms the auto-brakes after 3 seconds. Such a fault either indicates early pressure application (solenoid pressure high) or failure of the B ON-RAMP circuit (B ON-RAMP failed "on"). After touchdown, if either solenoid pressure or B ON-RAMP fails to turn on, a disagreement is detected which disarms the autobrakes after 3 seconds. Such a fault either indicates a failure of autobrakes to apply (low solenoid presure) or failure of the B ON-RAMP circuit (B on-ramp failed "off").

Now with regard to control system faults, the control circuit faults are monitored by comparing the B ON-RAMP to the low deceleration monitor and the control pressure switch. The low deceleration monitor is a signal generated by the control circuit which indicates an airplane deceleration level more than one foot per second squared below the level selected by the pilot. The control pressure switch indicates whether the auto-brake output pressure is above or below 1000 psi. The circuit detects a fault condition when either (1) the B ON-RAMP is off, and a high deceleration signal or high control pressure exists, or (2) the B ON-RAMO is on, and a low deceleration signal and low control pressure exist. When auto-brakes are armed, but no B ON-RAMP exists, the commanded deceleration level (MIN, MED, or MAX) is not being met by the wheel deceleration so a standing low deceleration signal should exist. If it does not exist, a fault condition is detected (high deceleration with no B ON-RAMP). Also, if the control pressure switch indicates high pressure when no B ON-RAMP exists, a fault condition is detected. When the B ON-RAMP is "on," the low deceleration error should cause the control pressure rise at 500 psi per second until the selected deceleration level is met. So, if a low deceleration error and a low control pressure exist when the B ON-RAMP is "on," a fault condition is detected. Since the control pressure is inhibited from rising more rapidly than 500 psi per second, this fault condition can exist for as long as two seconds during normal operation with no fault actually having occurred in the system. To prevent this temporary "normal fault condition" from causing a system disarm, the auto-brake fault monitor time delay requires that the fault condition last for 3 seconds before disarming the system. However, if, after 3 seconds, neither the low deceleration error nor the low control pressure signals have disappeared, then the system operation is abnormal and the system is disarmed. During normal operation on a wet runway, if the selected deceleration level cannot be achieved due to low ground MU, either the deceleration error will cause the control pressure to increase past 1000 psi, or skid cycling will generate momentary high deceleration signals and prevent system disarm.

In accordance with a preferred embodiment of the present system, the average airplane deceleration level is compared to the level selected by the pilot to generate a deceleration error. A low deceleration error causes auto-brake pressure to increase and a high deceleration error causes brake pressure to decrease. The magnitude of the error is limited so that the rate of auto-brake pressure change cannot exceed ± 500 psi per second. This insures smooth brake pressure modulation and no loss of anti-skid braking efficiency during skid activity. Also, when the low deceleration error reaches its limit (about one foot per second squared), the signal is coupled on to the fault monitor logic to indicate low deceleration. Since this limit commands auto-brake pressure to rise at 500 psi per second, either the auto-brake pressure should soon exceed 1000 psi (control pressure switch) or the increased pressure should increase airplane deceleration enough to eliminate the error. If neither happens within 3 seconds, then the fault monitor logic detects a control system fault and disarms auto-brakes. The deceleration error then passes through the integrator (rate of change of output is proportional to magnitude of input) to generate a pressure command, and then through the valve driver to the pressure control valve. Pressure command limits of 1800 and 300 psi prevent excess autobrake pressure which may reduce anti-skid braking efficiency and excess pressure reduction which may delay reapplication of brakes after reducing reverse thrust. When ON-RAMP power is enabled by the logic, several signals are sent to the control circuit. First, the 28 volt ON-RAMP power enables the pressure control valve driver. Then the ON-RAMP power regulator sends a 15Volt command to the intial brake fill spike circuit, the pressure limit circuit enable, and the initial deceleration overshoot circuit. The initial brake fill spike circuit bypasses the control circuit and sends a short duration high pressure command pulse to the pressure control valve to fill the slack volume of the brakes. The pressure limit circuit enable command drives the integrator output to 300 psi to start the smooth brake application (was commanding zero psi before the "on-ramp" was commanded). The deceleration overshoot circuit commands an initial brake application of 500 psi per second to insure pilot "feel" of auto-brakes at touchdown. When MIN (4ft/sec$^2$) or MED (6 ft/sec$^2$) is selected, the control circuit works as described above. However, when MAX is selected, the control circuit, pressure limits, and overshoot commands are bypassed or overridden, and a full system pressure braking effort is commanded. The MAX setting, therefore, truly gives maximum effort braking from the earliest possible moment after touchdown. As a result, it is intended that this setting be used only during aircraft emergencies.

Preferred embodiments of the present invention are described and illustrated in the attached drawings, wherein:

FIG. 5 is illustrative of a side view of a landing gear truck arrangement useful for coupling to wheelspeed deceleration signal generating circuit means and wheel speed spinup detector circuit means of the system of FIG. 1 to provide these information signals useful in signal processing in the system of FIG. 1;

FIG. 6 is illustrative of a side view of a multiple wheeled main landing gear truck at the instant of touchdown of the aircraft;

FIG. 7 is also illustrative of a side view of the truck of FIG. 6 at a subsequent time during the landing sequence when the rear and forward wheels of the truck are in contact with the runway surface;

FIG. 8 is a graph of wheelspeed information signals versus time of the front and rear wheels of the landing gear truck during the period subsequent to touchdown helpful in understanding how deceleration controlled braking is provided in automatic braking systems such as shown in FIG. 1.

Figure 1:
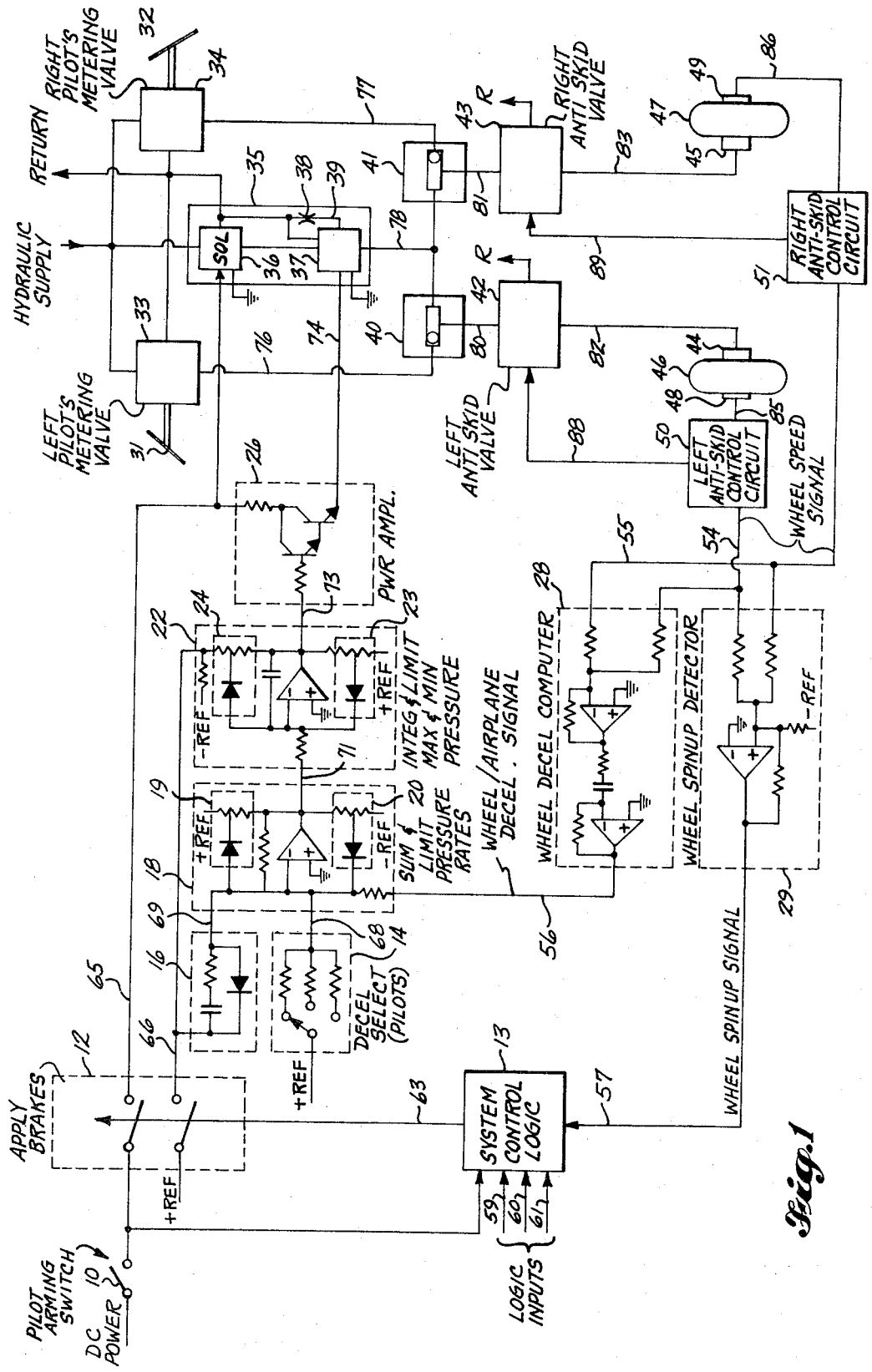
FIG. 1 is a schematic diagram of a preferred embodiment of an aircraft braking system showing signal processing for developing brake pressure control signals, amplification thereof and an exemplary hydraulic system coupled for purposes of illustration of a complete system.

Turning now to the automatic braking system of FIG. 1. it will be noted that the pilot prepares the present control system for automatic braking prior to landing by closing the pilot arming switch 10 thereby supplying D. C. power to system logic control circuit means 13 and also by rotating deceleration level selecting switch means 14 to the deceleration level desired. Upon selection of a desired deceleration level, a pilot's deceleration command signal 68 is generated through the coupling of a positive reference potential to one of a plurality of calibrated resistors shown in deceleration level selecting switch means 14. The deceleration command signal 68 is coupled to the deceleration error signal computing and amplitude limiting circuit means 18 thereby setting the deceleration braking level commanded by the system subsequent to aircraft touchdown.

Upon subsequent touchdown of the aircraft which includes in the embodiment of FIG. 1 a hydraulic system coupled for purposes of illustration to a single main gear wheel disposed on each side of the aircraft, left and right wheelspeed signals 54 and 55 are obtained from the respective left and right anti-skid control circuit means 50 and 51 which develop and utilize such signals in a known manner. These left and right wheelspeed signals 54 and 55 are both coupled respectively to wheelspeed deceleration signal generating circuit means 28 and wheelspeed spinup detector circuit means 29. In the circuit embodiment of FIG. 1, wheelspeed deceleration signal generating circuit means 28 averages left and right wheelspeed signals 54 and 55 and further differentiates the average of the wheelspeeds and further filters out high frequency perturbations to provide a wheel/aircraft deceleration signal 56 representative of the average deceleration of left and right wheels 46 and 47. Wheelspeed spinup detector circuit means 29 in this circuit embodiment averages left and right wheelspeed signals 54 and 55 and further compares the average signal to a predetermined wheelspeed spinup level thereby acting as a switching means to provide a wheelspeed spinup signal 57 having a negative potential level prior to predetermined wheelspeed spinup level detection and having a positive reference potential subsequent to detection of the predetermined wheelspeed spinup level.

Turning now to system logic control circuit means 13, it will be noted that a system logic control signal 63 is developed at the output of system logic control circuit means 13 which is coupled to system logic controlled switching means 12. In the presence of a plurality of logic signals 59, 60, and 61 representative respectively of a plurality of aircraft operating parameters and wheelspeed spinup signal 57, system logic control signal 63 actuates system logic controlled switching means 12 thereby coupling brake application enabling power 65 to hydraulic power shutoff valve means 36 of automatic braking control valve means 35 causing opening of shutoff valve means 36. Upon opening of shutoff valve means 36, hydraulic power is transmitted to automatic braking pressure modulating valve means 37, and now brake pressure control signal power amplifier 26 which couples automatic braking pressure regulating power 74 to automatic braking pressure modulating valve means 37 can provide automatic braking pressure 78 at the output of automatic braking control valve means 35. System logic control circuit means 13 comprises e.g. an AND circuit which provides system logic control signal 63 when logic input signal 59 representative of the output of the aircraft "Air/Ground Mode" switch signal, absence of advance of throttle representative logic input signal 60, logic input signal 61 representative of absence of a pilot's brake pedal application, and wheelspeed spinup signal 57 are all present. Upon actuation of system logic controlled switching means 12 by system logic control signal 63, deceleration control circuit enabling signal 66 comprising a D.C. level reference potential is coupled to initial aircraft deceleration overshoot command signal circuit generating means 16 and further coupled to maximum brake pressure control signal limiting circuit means 24 portion of deceleration error signal integrating and pressure control signal limiting circuit means 22 thereby permitting circuit means 22 to modulate brake pressure control signal 73 from an initial value as set by minimum brake pressure control signal limiting means 24 to a subsequent value in the control channel necessary to maintain the aircraft deceleration rate selected by the pilot and as commanded by the initial aircraft deceleration overshoot command signal circuit generating means 16.

After automatic braking has been intiated, the aircraft deceleration error signal generating and amplitude limiting circuit means 18 adds the initial aircraft deceleration overshoot command signal 69 to the previously selected pilot's deceleration command signal 68, the sum of which comprises the net aircraft deceleration command, and further substracts from that sum the wheel/aircraft deceleration signal 56 to generate to an aircraft deceleration error signal 71 which is representative of the magnitude and polarity of the difference between commanded and actual deceleration levels, and further limits the aircraft deceleration error signal 71 to maximum positive and negative values with the deceleration error limiting circuit means 19 and 20, respectively. The aircraft deceleration error signal 71 is then coupled to the deceleration error signal integrating and presure control signal limiting circuit means 22 which integrates this signal to generate a brake pressure control signal 73, and further limits the brake pressure control signal 73 to predetermined maximum and minimum values with the maximum and minimum brake pressure control signal limiting circuit means 23 and 24, respectively. The brake pressure control signal is then coupled to the brake pressure control signal power amplifier means 26 which generates the automatic braking pressure regulating power 74 representative of the brake pressure control signal 73, and the automatic braking pressure regulating power 74 is then coupled to the brake pressure control valve 37 portion of automatic braking control valve means 35 which generates an automatic braking pressure 78 which is representative of the automatic braking pressure regulating power 74 and thereby representative of the brake pressure control signal 73. It can now be seen that since the automatic braking pressure 78 is representative of the brake pressure control signal 73 and since the maximum and minimum brake pressure control signal limiting circuit means 23 and 24 portion of the deceleration error signal integrating and pressure control signal limiting circuit means 22 limits the maximum and minimum values of the brake pressure control signal 73, then the maximum and minimum brake pressure control signal limiting circuit means 23 and 24, respectively, can be set and adjusted to limit the maximum and minimum values respectively which the automatic braking pressure 78 can obtain during automatic braking. Also, it can be now seen that since the brake pressure control signal 73 is the integral of the airplane deceleration error signal 71, then the amplitude and polarity of the airplane deceleration error signal 71 is representative of the positive or negative rate of change of the brake pressure control signal 73 and consequently the positive and negative rate of change of the automatic braking pressure 78. Therefore, the deceleration error limiting circuit means 19 and 20 portions of the airplane deceleration error signal generating and amplitude limiting circuit means 18 in effect can be set and adjusted to limit respectively the maximum positive and negative rate of change of automatic braking pressure 78 during automatic braking. Finally, it can now be observed that aircraft deceleration overshoot command signal circuit generating means 16 operates in such a manner as to cause an initially high deceleration overshoot command signal 69 at the summing input to the aircraft deceleration error signal generating and amplitude limiting circuit means 18 when the system logic controlled switching means 12 is first actuated, and then causes the initial deceleration overshoot command signal 69 to decay with time (exponentially in this embodiment) to zero, and thereby the initial deceleration overshoot command signal 69, being added to the pilot's deceleration command signal 68 as selected by the pilot with the deceleration level selecting switch means 14, causes a net aircraft deceleration command that is initially high and then decays (exponentially) to the level selected by the pilot for the remaining operation of the automatic braking system, thereby giving the pilot a certain "feel" when automatic braking is first applied. It should be noted that the rate of application of automatic braking pressure 78 caused by this initial deceleration overshoot command signal 69 is limited to the rate as set by the deceleration error limiting circuit means 19 and 20 portions of the airplane deceleration error signal generating and amplitude limiting circuit means 18 as previously described.

Turning now to the hydraulic portion of the system, a simplified embodiment of which is depicted herein in FIG. 1 for illustrative purposes, hydraulic fluid is supplied to the left and right pilot's pedal operated pressure metering valve means 33 and 34, respectively, and one automatic braking control valve means 35. The left and right pilot's pedal operated pressure metering valve means 33 and 34, respectively, each in known manner generate a left and right pilot's metered braking pressure 76 and 77, respectively, which is representative of the force with which the pilot applies his left and right, respectively, pilot's brake pedal means 31 and 32. The automatic braking control valve means 35 generates an automatic braking pressure 78 in the manner previously described to regulate airplane deceleration. Also, in accordance with this hydraulic embodiment, the automatic braking control valve means 35 incorporates an hydraulic fluid restrictor means 38 in the automatic braking pressure modulating valve return line 39 which slows down the release of hydraulic fluid e.g. automatic braking pressure 78 through the automatic braking control valve means 35 to the hydraulic return line, thereby insuring a gradual and comfortable release of automatic braking pressure 78 when the automatic braking system is turned off. Now, noting the operation of the left hand side of the hydraulic system and observing that the right hand side operates in an identical manner with a single automatic braking pressure 78 being common to both sides, the left pilot's metered braking pressure 76 is coupled to one input port of the left shuttle valve 40 and the automatic braking pressure 78 is connected to the other input port of the left shuttle valve 40. Left shuttle valve 40 then compares the two input pressures, left pilot's metered braking pressure 76 and automatic braking pressure 78, and blocks the lower of the two input pressures while permitting the higher of the two input pressures to freely pass through the left shuttle valve 40 to become the left braking pressure 80. For example, during automatic braking when the left pilot's metered braking pressure 76 is lower than the automatic braking pressure 78 the left shuttle valve 40 blocks the left pilot's metered braking pressure 76 and allows the automatic braking pressure 78 to freely pass through the left shuttle valve 40 to become the left braking pressure 80. Then when the pilot applies sufficient left pilot's metered braking pressure 76 to exceed the automatic braking pressure 78, left shuttle valve 40 blocks the automatic braking pressure 78 and allows left pilot's metered braking pressure 76 to freely pass through left shuttle valve 40 to become left braking pressure 80. Left braking pressure 80 is then coupled to left anti-skid valve 42 which generates left brake pressure 82 as commanded by left anti-skid valve signal 88. Left brake pressure 82 is then coupled to left brake 44 which applies braking torque to left wheel 46. For illustrative purposes herein, a left anti-skid wheel speed transducer 48 continuously generates a left "raw" wheel speed signal 85 in known manner which is representative of the rolling speed of left wheel 46. Left "raw" wheel speed signal 85 is then coupled to the left anti-skid control circuit 50 which, in known manner, generates a left wheel speed signal 54 to be representative of the rolling speed of left wheel 46 and also generates a left anti-skid valve signal 88 which is in turn coupled to the left anti-skid valve 42.

The anti-skid system comprises left anti-skid wheel speed transducer 48, left anti-skid control circuit 50, and left anti-skid valve 42. Left anti-skid control circuit 50 continually monitors left "raw" wheel speed signal 85 from left anti-skid wheel speed transducer 48 to generate the left wheel speed signal 54 and then continually monitors the left wheel speed signal 54 to determine whether the left wheel 46 is skidding. If the left anti-skid control circuit determines that no skid activity exists, then the circuit transmits a left anti-skid valve signal 88 to the left anti-skid valve 42 causing it to freely pass the left metered braking pressure 80 through the valve and become the left brake pressure 82. If the left anti-skid control circuit 50 determines that skid activity does exist, then the circuit tranmits a left anti-skid valve signal 88 to left anti-skid valve 42 causing it to reduce the left brake pressure 82 by some variable amount below the level of the left metered braking pressure 80, thereby correcting the skidding condition of left wheel 46.

During typical operation of the automatic braking system, it can be seen that when the left and right brake pressures 82 and 83 are not sufficiently high to cause wheel skids, the automatic braking pressure 78 at the output of the automatic braking control valve means 35 would pass freely through both the left and right shuttle valves 40 and 41 and the left and right anti-skid valves 42 and 43 to become the left and right brake pressures 82 and 83, respectively. Left and right brake pressures 82 and 83 exert a braking force to the left and right wheels 46 and 47 causing the aircraft to decelerate. Since the left and right wheels 46 and 47 are assumed not to be in a skid condition, the rolling speed of the wheels is substantially representative of the aircraft velocity and therefore the wheel/aircraft deceleration signal, which is generated by wheelspeed deceleration signal generating circuit means 28 to be the derivative of the average of the left and right wheelspeed signals 54 and 55, is substantially representative of the rate of aircraft deceleration. This wheel/aircraft deceleration signal 56 is then compared by the aircraft deceleration error signal generating and amplitude limiting means 18 to the sum of the pilot's deceleration command signal 68 and the initial deceleration overshoot command signal 69 to generate an aircraft deceleration error signal 71. The aircraft deceleration error signal 71 is then integrated by deceleration error signal integrating and pressure control signal limiting circuit means 22 to generate brake pressure control signal 73 which in turn causes the brake pressure control signal power amplifier means 26 and automatic braking pressure modulating valve means 37 to generate an automatic braking pressure 78 and consequent left and right brake pressures 82 and 83, respectively, which are representative of the brake pressure control signal 73. When the aircraft deceleration error signal generating and amplitude limiting circuit means 18 detects an aircraft deceleration level, as represented by the wheel/aircraft deceleration signal 56, which is less than the commanded deceleration level, as represented by the sum of the pilot's deceleration command signal 68 and the initial deceleration overshoot command signal 69, the resulting aircraft deceleration error signal 71 causes deceleration error signal integrating and pressure control signal limiting circuit means 22 to increase the automatic braking pressure 78, and thereby left and right brake pressures 82 and 83, respectively, at a rate which is representative of the amplitude of the aircraft deceleration error signal 71, the rate being limited by deceleration error signal limiting circuit means 19, thereby causing an increase in aircraft deceleration as represented by the wheel/aircraft deceleration signal 56, and a decrease in the magnitude of the aircraft deceleration error signal 71.

When the aircraft deceleration error signal generating and amplitude limiting circuit means 18 detects an aircraft deceleration level, as represented by the wheel/aircraft deceleration signal 56, which is greater than the commanded deceleration level, as represented by the sum of the pilot's deceleration command signal 68 and the initial deceleration overshoot command signal 69, the resulting aircraft deceleration error signal 71 causes deceleration error signal integrating and pressure control signal limiting circuit means 22 to decrease the automatic braking pressure 78, and thereby the left and right brake pressures 82 and 83, respectively, at a rate which is representative of the amplitude of the aircraft deceleration error signal 71, the rate being limited by deceleration error signal limiting circuit means 20, thereby causing a decrease in aircraft deceleration, as represented by the wheel/aircraft deceleration signal 56, and a decrease in the magnitude of the aircraft deceleration error signal 71.

If wheel skidding begins to occur, e.g. sudden decrease in left or right wheel speed signals 54 or 55, left and right anti-skid control circuits means 50 and 51, respectively, cause left and right anti-skid valve means 42 and 43, respectively, to reduce left and right brake pressures 82 and 83, respectively, below the automatic braking pressure 78 and thereby prevent or correct for the sudden decrease in left and right wheel speed signals 54 and 55, respectively. This reduction of the left and right brake pressures 82 and 83 causes the aircraft deceleration, as represented by the wheel/aircraft deceleration signal, to be reduced. The effects by any momentarily sharp decreases and increases in speed of the left and right wheels 46 or 47, respectively, as caused by anti-skid controlled braking are substantially minimized by the wheel speed averaging and deceleration filtering characteristics of the wheel speed deceleration signal generating circuit means 28 and by the cancelling effect of the high deceleration that occurs as the wheel goes into a skid followed by the high acceleration that occurs as the wheel recovers from the skid. Therefore, even during wheel skid activity, the wheel/aircraft deceleration signal 56 is substantially representative of the actual aircraft deceleration, so, when left and right brake pressures 82 and 83, respectively, have been lowered by the anti-skid system due to skid activity, the resulting decrease in aircraft deceleration, as representd by the lower wheel/aircraft deceleration signal 56, causes automatic braking pressure 78 to increase. Since left and right anti-skid control circuit means 50 and 51, respectively, will not allow increased automatic braking pressure 78 to cause an increase in left and right brake pressures 82 and 83, respectively, beyond the level which causes skid activity, the condition of low aircraft deceleration persists despite the increase in automatic braking pressure 78, and so the automatic braking pressure 78 continues to rise until either the aircraft deceleration reaches the commanded level or the automatic braking pressure 78 reaches the level set by the maximum brake pressure control signal limiting circuit means 23 portion of deceleration error signal integrating and pressure control signal limiting circuit means 22.

During anti-skid braking, the limits on automatic braking pressure 78 rate of change, as set by deceleration error circuit limiting means 19 and 20 portion of the airplane deceleration error signal generating and amplitude limiting circuit means 18, as previously described, prevent sudden changes in automatic braking pressure 78 which might interfere with the anti-skid system's ability to efficiently control skid activity, and therefore, the said rate limits insure that the automatic braking system will not degrade aircraft stopping ability during anti-skid controlled braking. Also, the preset limit on maximum automatic braking pressure 78, as set by maximum brake pressure control signal limiting circuit means 23 portion of the deceleration error signal integrating and pressure control signal limiting circuit means 22 in the manner previously described, prevents the automatic braking pressure 78 from reaching such a high level as to degrade the anti-skid system's ability to efficiently control skid activity, and therefore the maximum pressure limit insures that the automatic braking system will not degrade aircraft stopping ability during anti-skid controlled braking. The aforementioned maximum pressure limit would normally be preset to a high enough level to permit the automatic braking pressure 78 to reach a high enough level to cause the commanded deceleration level to be achieved during conditions where no anti-skid activity exists.

Finally, when the automatic braking system is disengaged by the pilot, normally by the application of the left and right pilot's brake pedal means 31 and 32, respectively, a logic signal, typically the pilot's brake pedal application signal 61, is transmitted to the system logic control circuit means 13 which in turn de-energizes the system logic controlled switching means 12 and thereby decouples the brake application enabling power 65 and the deceleration control circuit enabling signal 66. By removing deceleration control circuit enabling signal 66, minimum brake pressure control signal limiting circuit means 24 portion of the deceleration error signal integrating and pressure control signal limiting circuit means 22 reduces brake pressure control signal 73 so that the automatic braking pressure 74 is commanded to a release condition, and also the initial aircraft deceleration overshoot command signal circuit generating means 16 is "reset" to again command an initial deceleration overshoot command signal 69 when the next deceleration control circuit enabling signal 66 is generated. By removing the brake application enabling power 65, the hydraulic power shutoff valve means 36 portion of the automatic braking control valve means 35 is de-energized which causes the valve means to remove hydraulic power from the automatic braking pressure modulating valve means 37 portion of the automatic braking control valve means 35, and also brake pressure control signal power amplifier means 26 is de-energized which in turn removes the automatic braking pressure regulating power 74 which causes automatic braking pressure modulating valve means 37 to couple the automatic braking pressure 78 to the automatic braking pressure modulating valve return line 39.

When the automatic braking pressure 78 is coupled to the automatic braking pressure modulating valve return line 39, the hydraulic fluid restrictor means 38 causes the automatic braking pressure 78 to decrease at a rate which causes a smooth but noticeable automatic braking pressure 78 release. Also, as previously described, whenever the automatic braking pressure drops below the left and right pilot's metered braking pressures 76 and 77, respectively, left and right shuttle valve means 40 and 41, respectively, act to block the automatic braking pressure 78 and couple the left and right pilot's metered braking pressures 76 and 77 to the left and right metered braking pressures 80 and 81, respectively, thereby placing the entire braking system under normal pilot control.

Figure 2:
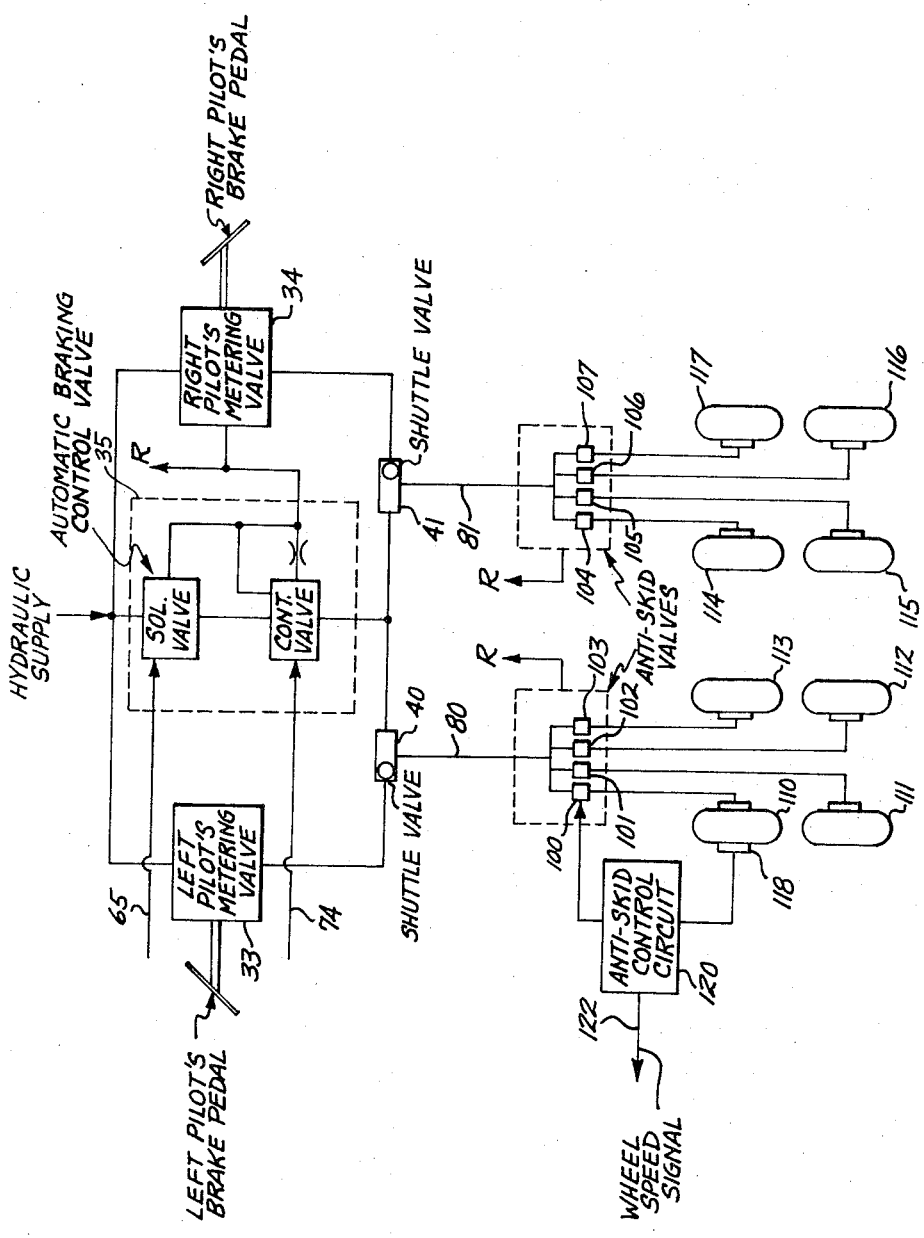
FIG. 2 is a further embodiment of a hydraulic portion useful in the system of FIG. 1 for coupling to the brake pressure control signals developed therein instead of the hydraulic portion shown in FIG. 1.
Figure 3:
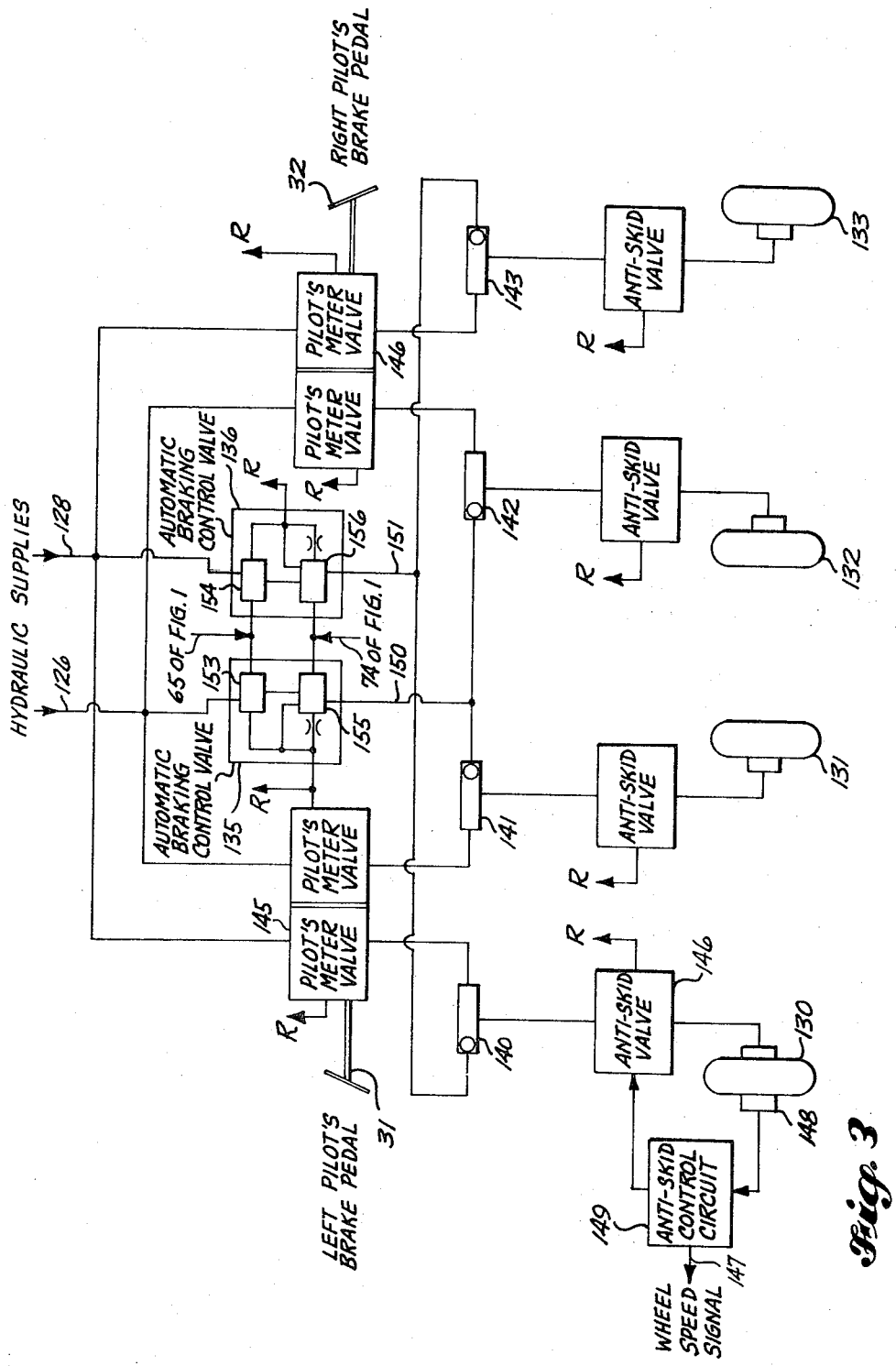
FIG. 3 is illustrative of another hydraulic system which may be coupled to the amplified pressure control signals developed in the control channel of FIG. 1.
Figure 4:
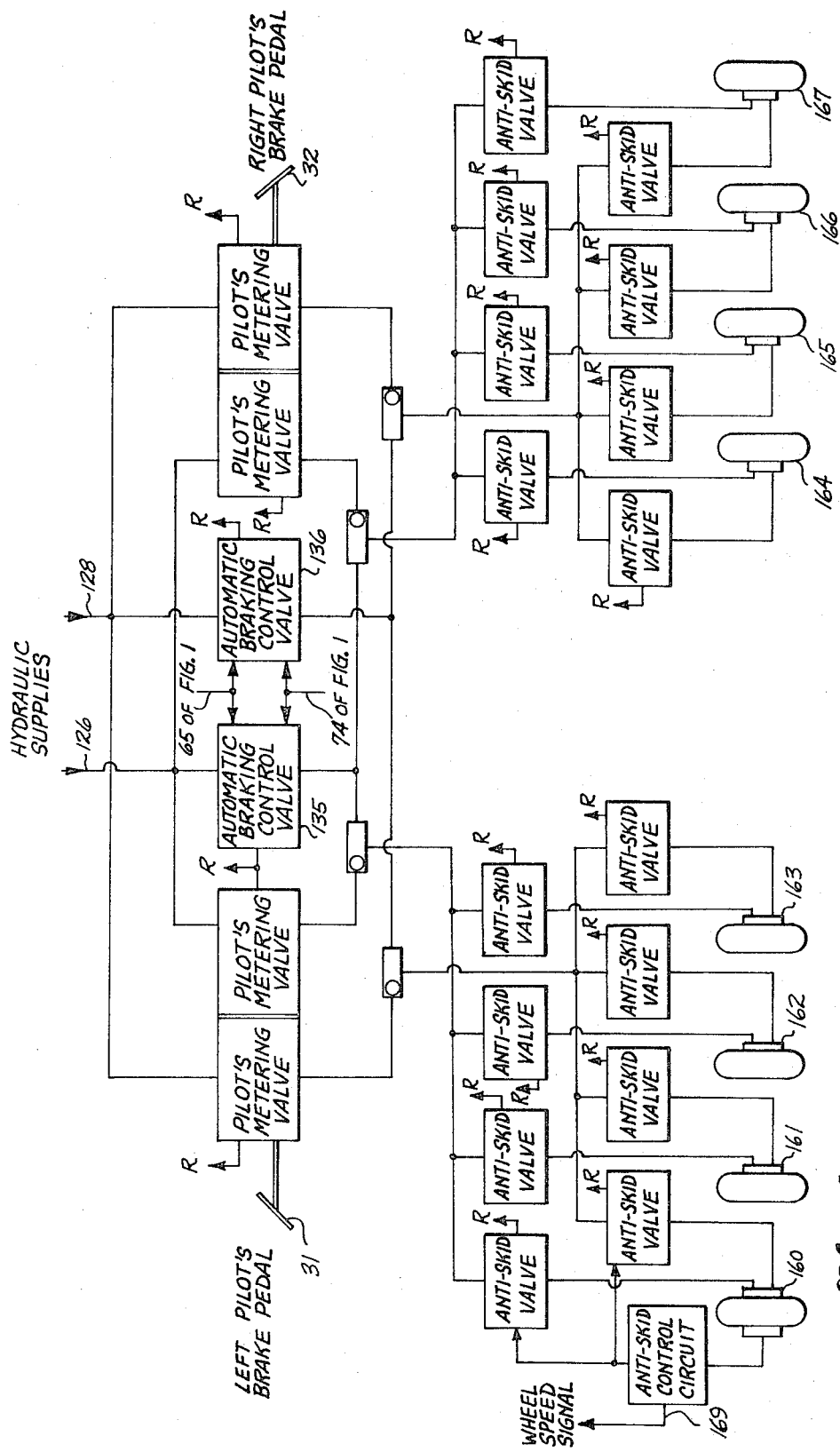
FIG. 4 is illustrative of yet a further hydraulic system which may be coupled to the amplified pressure control signals developed in the control channel of FIG. 1.

The following description relates to FIGS. 2, 3 and 4, wherein there are schematically depicted three embodiments of the hydraulic portion of the automatic braking system of FIG. 1 useful in three different aircraft hydraulic braking system configurations. FIG. 2 shows the automatic braking system hydraulic components coupled to an aircraft hydraulic braking a system having a plurality of braked wheels 100 through 107, all being serviced by a single hydraulic supply. This embodiment operates in a manner similar to the embodiment of FIG. 1 except the left and right shuttle valve means 40 and 41 provide left and right metered braking pressures 80 and 81, respectively, to a plurality of left and right anti-skid valve means 100, 101, 102 and 103, and 104, 105, 106, and 107, respectively, instead of the single left and right anti-skid valve means 42 and 43, respectively, of FIG. 1. Braked wheel 110 now described is typical of the operation of the other braked wheels 111 through 117 in being provided with an anti-skid wheelspeed transducer means 118, an anti-skid control circuit means 120, and an anti-skid control valve means 100 which are coupled together and operate in the manner previously described in connection with the system of FIG. 1 to provide skid protection to braked wheel 110 and to generate a wheelspeed signal 122 which is representative of the rotary speed of braked wheel 110, so that there is a single wheelspeed signal that is generated by each braked wheel to be representative of the rotary speed of that respective braked wheel. Any number and combination of wheelspeed signals are then coupled to the wheelspeed deceleration signal generating circuit means 28 of FIG. 1 which generates a wheel/aircraft deceleration signal 56 representative of the average deceleration of that number and combination of wheelspeed signals, and the same or different number and combination of wheelspeed signals are then coupled to wheelspeed spinup detector circuit means 29 of FIG. 1 which generates a wheelspeed spinup signal 57 when the average of said same or different number and combination of wheelspeed signals exceeds the preset spinup threshold.

Now, for example, FIG. 5 shows a main landing gear configuration where it is advantageous to couple all the wheelspeed signals typical of 204 from the rear wheels typical of 201 on each main landing gear truck beam typical of 200 to wheelspeed deceleration signal generating circuit means 28 of FIG. 1 so that the circuit generates a wheel/aircraft deceleration signal 56 which is representative of the average deceleration of the rear wheels on all the main landing gear truck beams typical of 200 and further to couple all the wheelspeed signals typical of 205 from the forward wheels typical of 202 on each main landing gear truck beam typical of 200 to the wheelspeed spinup detector circuit means 28 of FIG. 1 so that the circuit generates a wheelspeed spinup signal 57 when the average speed of the forward wheels on all the main landing gear truck beams exceeds the preset spinup threshold. By way of this embodiment, FIG. 6 shows a side view of a multiple wheeled main landing gear at the instant of aircraft touchdown, and shows that the main landing truck beam 200 is biased to tilt upward in flight so that the rear wheels typical of 201 contact the runway at touchdown prior to the forward wheels typical of 202. FIG. 7 shows the same main landing gear a moment later when the aircraft has touched down firmly and both the rear and forward wheels 201 and 202, respectively, have contacted the runway. FIG. 8 is an illustrative plot of wheelspeed signal versus time for the rear and forward wheels typical of 201 and 202, respectively, showing that due to the rear wheels contacting the runway prior to the forward wheels, the rear wheels spin up to a speed synchronous with the aircraft velocity prior to the forward wheels. By coupling the forward and rear wheelspeed signals typical of 205 and 204, respectively of FIG. 5 to the wheelspeed spinup detector circuit means 29 and the wheelspeed deceleration signal generating circuit means 28, respectively, of FIG. 1, a wheelspeed spinup signal 57 is not generated to cause the system to begin to apply deceleration controlled braking until the rear wheelspeeds have achieved or nearly achieved a speed synchronous with the velocity of the aircraft, thereby minimizing or eliminating the momentary error in the wheel/aircraft deceleration signal 57 of FIG. 1 caused by initial wheel spinup. Another advantage of present coupling of the forward and rear wheelspeed signals 205 and 204, respectively, to the wheelspeed spinup detector circuit means 29 and the wheelspeed deceleration signal generating circuit means 28, respectively, of FIG. 1, as shown in FIG. 5, is that it is desirable that most or all of the braked wheels be partly or completely spun up before brake pressure is applied so that the anti-skid system can adequately provide skid protection, since if brakes were applied prior to wheel spinup, and if brake pressure were sufficient to cause a wheel skid or prevent spinup, and if no other means were provided to the anti-skid system to know that a locked wheel condition existed, then blown tires would result.

Turning now to FIG. 3, the automatic braking system hydraulic components are shown coupled to an aircraft hydraulic braking system having a plurality of braked wheels 130 through 133, an equal number of each being serviced by only one of two hydraulic supplies 126 or 128. This embodiment operates in a similar manner as the embodiment of FIG. 1 except that there are two complete brake hydraulic systems including two automatic braking control valve means 135 and 136 and four shuttle valve means 140 through 143 and the left and right pilot's brake pedal means 31 and 32, respectively, each operate a pair of left and right pilot's pedal operated pressure metering valve means 145 and 146, respectively. Braked wheel 130 is shown as typical of the other braked wheels 131, 132, and 133 in being provided with an anti-skid wheelspeed transducer means 148, an anti-skid control circuit means 149, and an anti-skid control valve means 146, which are coupled together and operate in known manner as previously described to provide skid protection to braked wheel 130 and to generate a wheel speed signal 147 which is representative of the rotary speed of braked wheel 130, so that there is a single wheel speed signal that is generated by each braked wheel to be representative of the rotary speed of that respective braked wheel. Any number and combination of wheel speed signals are then coupled to the wheel speed deceleration signal generating circuit means 28 and wheel speed spin-up detector circuit means 29 of FIG. 1 as previously described. The two automatic braking control valve means 135 and 136 are coupled to the automatic braking system electrical system of FIG. 1 in such a manner that both automatic braking control valve means 135 and 136 operate substantially identically and simultaneously with each other to generate equal automatic brake pressures 150 and 151 at all times. For example, the brake application enabling power 65 of FIG. 1 could be coupled in parallel to both hydraulic power shutoff valve means 153 and 154 of FIG. 3 and the automatic braking pressure regulating power 74 of FIG. 1 could be coupled in series to both automatic braking pressure modulating valve means 155 and 156, and thereby cause the brake application enabling power 65 of FIG. 1 to open both hydraulic power shutoff valve means 153 and 154 of FIG. 3 simultaneously and cause the automatic braking pressure regulating power 74 of FIG. 1 to command both automatic braking pressure modulating valve means 155 and 156 of FIG. 3 to simultaneously regulate the automatic braking pressures 150 and 151, respectively, to be subsantially equal at all times and representative of the automatic braking pressure regulating power.

Turning now to FIG. 4, the automatic braking system hydraulic components are shown coupled to an aircraft hydraulic braking system having a plurality of braked wheels 160 through 167 each being serviced by both of two hydraulic supplies 126 and 128. This embodiment opeates in a similar manner to the embodiment of FIG. 3 except that each braked wheel 160 through 167 contains a brake which is actuated by either or both of two separate brake pressures so that each braked wheel is serviced by a brake pressure from each hydraulic supply. As in FIG. 2 and 3, a typical anti-skid control circuit is shown for a braked wheel which is coupled to provide skid protection for the braked wheel and further provides a wheelspeed signal 169 which is representative of the rotary speed of bracket wheel 160. The wheelspeed signals typical of 169 are coupled to the electrical control system of FIG. 1 as explained in connection with FIG. 2. The electrical control system of FIG. 1 is coupled to the two automatic braking control valve means 135 and 136 as explained earlier in connection with the description of FIG. 4.

Figure 9:
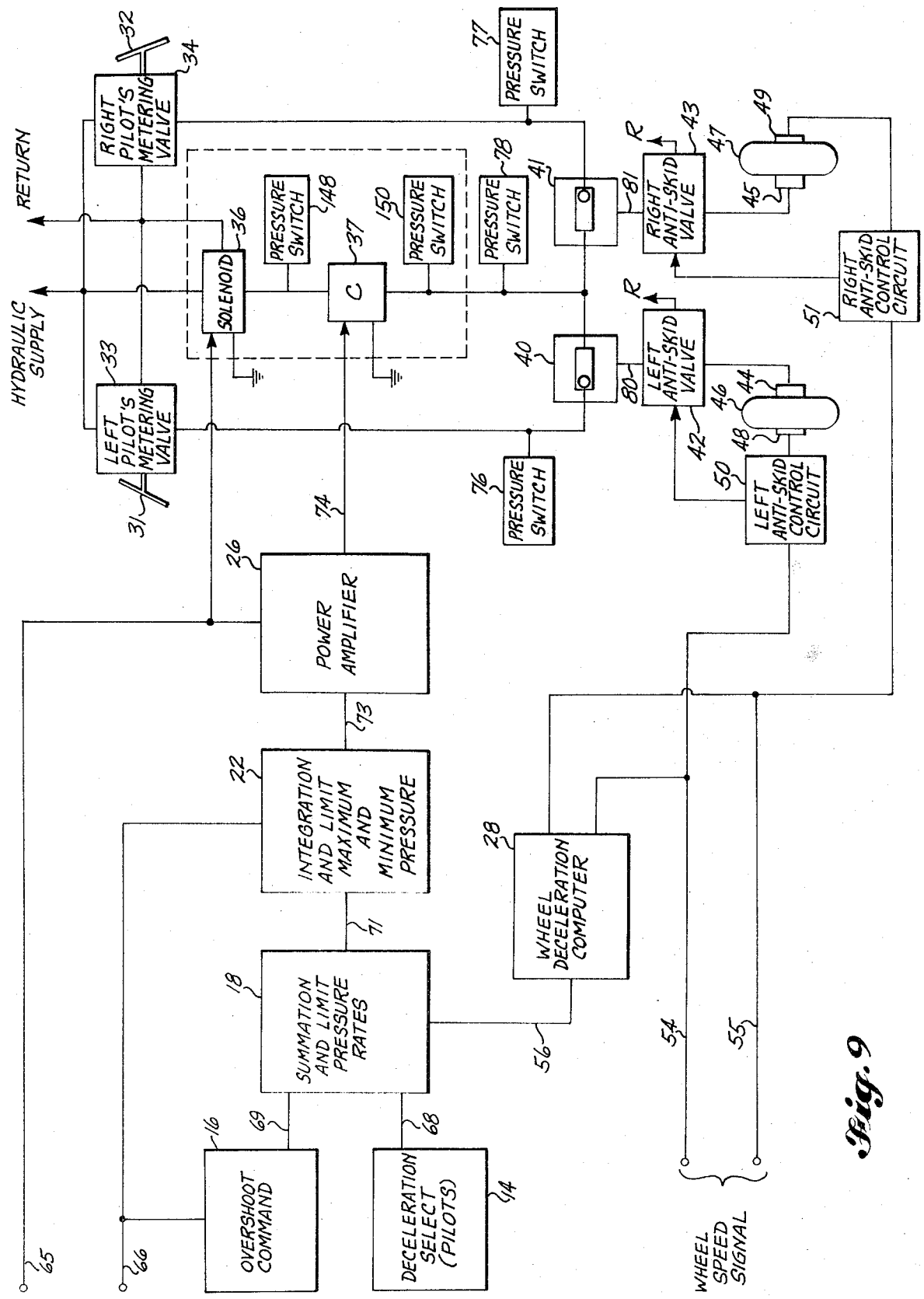
FIG. 9 is illustrative of the automatic braking system of FIG. 1 shown partially in block diagram to facilitate the understanding of how the auto-brake logic controls said system.
Figure 10:
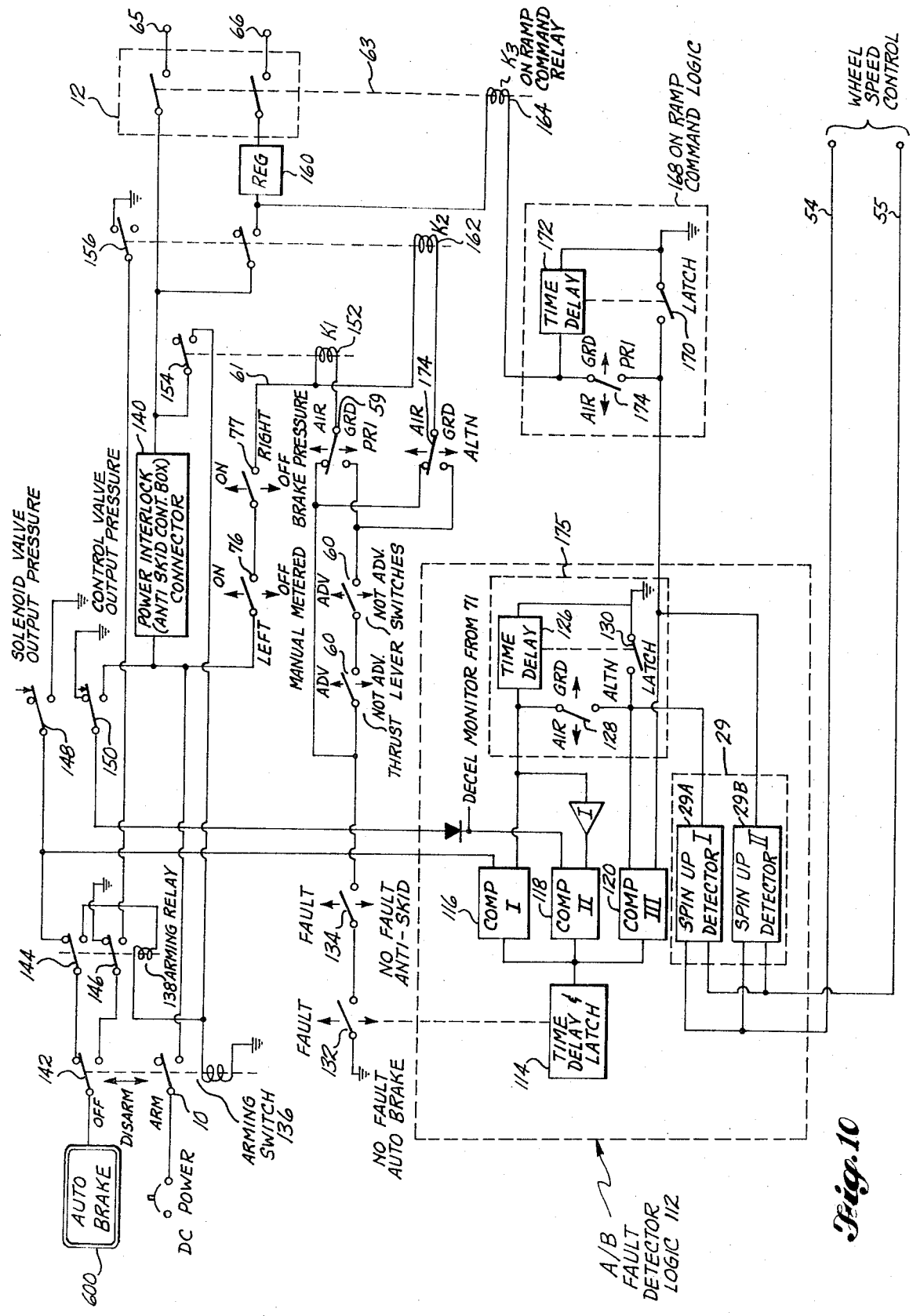
FIG. 10 is illustrative of the atuo-brake logic control portion and when read with FIG. 9 is illustrative of the present aircraft automatic braking system having autobrake control logic.

Referring now to system control logic shown in FIG. 10, which should be read connected into the system of FIG. 9, it will be noted that the pilot arms the system of FIGS. 9 and 10 for automatic braking prior to landing by closing the pilot arming switch 136 thereby supplying DC power throudh switch 10 and coupling arm enable power to the system arming and control logic.

The system is armed prior to each landing. The requirements for system arming are:

Auto-brake power on and,
  anti-skid on with no faults (switching means 134 closed) and,
  Manual brake pressure left (pressure detector switching means 76 closed) and manual brake pressure right (pressure detector switching means 77 closed) below 1000 psi and
  Auto-brake system no faults (switching means 132 closed) and
  Thrust levers No. 1 and No. 3 (switching means 60) not advanced to the take-off range on ground.

Two separate circuits provide for redundant disarm and indication. The primary circuit which operates K1 (relay means 152) interrupts holding power to arming switch 136 and arming relay 138 when a disarm signal is detected which will release switch contact 154. This action releases auto-brake pressure, causes arming switch 136 to fall to DISARM de-energizing relay 138 causing AUTO-BRAKE light 600 to illuminate. The secondary circuit which operates K2 (relay means 162) interrupts the power to K3 (relay means 164), the "ON-RAMP COMMAND" relay when a disarm signal is detected. This action releases auto-brake pressure and provides a ground signal to "Auto-Brake" light 600 through arming relay 138 if the primary disarm circuit fails to release arming switch 136 to the DISARM position. The input logic to the primary and secondary arming circuits is identical except that the primary circuit uses the primary landing gear logic air/ground signal provided by switching means 59 and the secondary circuit uses the alternate landing gear logic air/ground signal provided by switching means 174.

If both the primary and secondary circuits are armed, ON-RAMP COMMAND logic circuit means 168 provides a ground signal to K3 (relay means 164), which in turn provides a signal to system controlled switching means 12. (See FIG. 1). The ground signal to relay means 164 is provided when the primary air/ground switching means 174 is in the GND position (closed) and the SPIN-UP detector II means 29B indicates SPIN-UP. After the ON-RAMP has been held on for three seconds, time delay circuit means 172 provides a signal to close latching circuit means 170 which allows the SPIN-UP signal to disappear without removing the ground signal to relay means 164, provided primary GND signal means 174 is maintained (switching means 174 closed). If the airplane bounces into the air, ON-RAMP command logic circuit 168 removes the ground signal to relay means 164 and the latching circuit means 170 will open. The system, however, remains armed and when the next touchdown occurs, both GND and SPIN-UP signals are required to supply a ground signal to the relay circuit means 164 (K3). After three seconds, the time delay circuit means 172 will provide signal to latch means 170. Time delay circuits e.g. 126 and 172 shown herein may comprise typical RC circuits designed for the specific time periods called for.

Fault detector logic circuit means 112 continuously monitors key points in the auto-brake system and disarms the system through both the primary and secondary arming circuits when a fault is detected by opening of switching means 132. The logic inputs to fault detector means 112 are provided by: alternate air/ground mode switching means 130; SPIN-UP detector I circuit means 29A; low deceleration monitor signal provided from lead 71; solenoid valve output pressure switching means 148; and control valve output pressure switching means 150.

When a fault condition occurs, it does not disarm the system immediately, since during normal operation some fault conditions will occur for short durations. However, if a fault condition lasts for 3 seconds, a fault is detected and latched on by time delay and latching circuit means 114, and a disarm signal is transmitted to the switch contact means 132. The fault will not unlatch circuit means 114 until arming power is lost.

Fault detector logic circuit means 112 is provided to detect three basic system faults:

1. Comparator I (circuit means 116) detecting ON-RAMP disagreement between output pressure detecting means 148 and signal at 124.
2. Comparator II (circuit means 118) detecting control system faults causing insufficient airplane deceleration pressure switch signals from 150, decel signal 71 and signal 124.
3. Comparator III (circuit means 120) comparing signals from detectors I (circuit means 29A) and II (circuit means 29B) disagreement or SPIN-UP latch (switching means 170) and (switching means 130) disagreement.

Any failure that may apply brakes too early or fails to apply sufficient braking during the landing is detected by one of the above detectors causing time delay and latching circuit means 114 to release switch contact means 132, thereby disarming the auto-brake system (K1 and K2).

Now with regard to ON-RAMP disagreement, it will be observed that on-ramp circuit means 175 generates an ON-RAMP signal 124, which provides a signal input to Comparator I (circuit means 116) and Comparator II (circuit means 118). ON-RAMP signal 124 is provided when the alternate AIR/GND switching means 128 is in the GND position and SPIN-UP detector II (circuit means 29B) indicates SPIN-UP. This signal is compared to the signal from solenoid valve output pressure switching means 148 (system ON-RAMP). Comparator I (circuit means 116) compares these signals and if the system is functioning properly the signals agree at all times. If not, a fault signal will be transmitted to time delay and latching circuit means 114 that will in turn provide the release signal to open switch contact 132 should be fault condition exist for at least three seconds. When the auto-brakes are armed in the air prior to touchdown and either the solenoid valve output pressure switching means 148 or on-ramp circuit output signal 124 has failed to provide an ON signal condition, a disagreement is detected by comparator I (circuit means 116) which provides a fault that disarms the auto-brakes after 3 seconds. Such a fault indicates either an early pressure application (solenoid valve output pressure switch means 148 high) or a failure in the on-ramp circuit means 175. Comparator circuits 116, 118, and 120 are all exclusive OR circuits which provide a low level signal out with like inputs and a high signal out with unlike inputs.

After touchdown, if either solenoid output pressure switching means 148 or on-ramp circuit output means 124 fails to indicate an ON condition, a disagreement is detected by Comparator I (circuit means 116) providing a fault level signal which disarms the auto-brakes after 3 seconds. Such a fault indicates either a failure of auto-brakes to apply (low hydraulic pressure) or a failure of on-ramp circuit means 175.

Now with regard to present control system faults, these circuit faults are monitored by comparing the on-ramp signal 124 to the low deceleration monitor signal at 71 and the control valve output pressure switching means 150 signal. The low deceleration monitor means signal present at lead 71 is a signal generated in the pressure control channel which indicates an aircraft deceleration level of more than one foot per second below the level selected by the pilot. The control valve output pressure switching means 150 detects whether the auto-brake output pressure is above or below 1000 psi. The various pressure switching means e.g. 150, 77, 78, etc. are coupled to hydraulic lines as shown to detect pressures and of course do not affect the pressures in the respective lines to which they are coupled. Comparator II (circuit means 118) combines these inputs and detects a fault condition when (1) either the on-ramp signal 124 is in an OFF condition and a high deceleration signal level at 71 is present or high control valve output pressure from control valve output pressure detector 150 exists or (2) the on-ramp signal 124 is ON and a low deceleration signal 71 is present and low control valve output pressure signal at 150 exists.

When auto-brakes are armed, but no on-ramp signal 124 is present, the commanded deceleration level is not being met by the wheel deceleration so a low deceleration signal at 71 should exist. If, however, it is not present, that fault condition is detected by Comparator II (circuit means 118). Also, if the control valve output pressure switch means 150 indicates high pressure when no on-ramp signal 124 exists, a fault condition is detected.

When the on-ramp signal 124 is ON, a low deceleration error signal at 71 should cause the control pressure means at control valve 37 to rise at a 500 psi per second rate until the selected deceleration level at decel select circuit means 14 (See FIG. 9) is met. So, if a low deceleration error signal at 71 and a low control valve output pressure signal at detector means 150 exist when the on-ramp circuit is ON, a fault condition is detected by Comparator II (circuit means 118). Since control valve 37 pressure is inhibited from rising more rapidly than 500 psi per second, this fault condition can exist for as long as two seconds during normal operation with no fault actually having occurred in the system. To prevent this temporary normal fault condition from causing a system disarm, the auto-brake fault monitor time delay and latch circuit means 114 requires that the fault condition last for three seconds before disarming the system. However, if after three seconds neither the low deceleration error signal 71 nor the low control valve output pressure 150 signals have disappeared, then the system operation is abnormal and the switch contact means 132 will open and disarm the system.

During normal operation on a wet runway, if the selected deceleration level at 14 cannot be achieved due to low ground MU either the low deceleration error at 71 will cause the control valve 37 pressure to increase past 1000 psi which actuates the control valve output pressure switching means 150 or wheel skid cycling will generate momentary high deceleration signals and prevent system disarm.

A further feature of the auto-brake logic shown in FIG. 10 includes spin-up or spin-up latch disagreement provisions. Fault monitor logic ciruit 112 includes on-ramp circuit means 175 which computes a redundant on-ramp signal 124. This signal is generated by spin-up detector II (circuit means 29A and alternate AIR/GND logic switching means 128 rather than from on-ramp command logic circuit means 168 which uses spin-up detector I (circuit means 129B) and primary AIR/GND switching means 174 logic. The spin-up or spin-up latch signals from circuits means 175 and circuit means 168 are compared by comparator circuit means 120 for disagreement. If a disagreement occurs, then a fault condition exists, and if this fault condition lasts for 3 seconds, time delay and latch circuit means 114 will provide a signal to open switch contact 132 which disarms the system. When auto-brakes are armed in the air prior to touchdown, and one spin-up or spin-up latch signal has failed to reach an ON condition, a disagreement is detected by comparator III (circuit means 120) which provides a signal to time delay and latch circuit means 114. Such fault either indicates possible early brake applications, or failure of spin-up fault detector II (circuit means 120). After touchdown, if one of the spin-up or spin-up latch signals fails to turn ON, a disagreement is detected by comparator III (circuit means 120) which disarms auto-brakes after 3 seconds. Such a fault either indicates a failure of auto-brakes to apply at touchdown or failure of the spin-up fault detector circuit means 175.

We claim:

1. An aircraft automatic braking system comprising in combination:

first means for providing a brake pressure control signal;

automatic braking pressure modulating valve means responsive to said brake pressure control signal for metering automatic braking pressure to first shuttle valve means for application of brakes on one side of the aircraft and second shuttle valve means for application of brakes on the other side of the aircraft;

first manually controlled pressure metering valve means coupled to said first shuttle valve means and second manually controlled pressure metering valve mean coupled to said second shuttle valve means;

shutoff valve means for transmitting hydraulic power to said automatic braking pressure modulating valve means; and automatic brake control logic circuit means including:

arming means for applying D.C. power to said first means, said arming means including arming switch means and arming relay means;

a first arming circuit for energizing a first relay to interrupt holding power to said arming switch means and said arming relay means in response to a disarm signal thereby releasing automatic braking pressure;

a second arming circuit for energizing a second relay and interrupting power coupled to a third relay in response to said disarm signal thereby releasing automatic braking pressure;

ON-RAMP COMMAND logic circuit means coupled to said third relay for energizing said third relay when said first and second arming circuits are in an armed condition, thereby opening said shutoff valve and enabling said automatic braking pressure valve to regulate automatic braking pressure.

2. The system according to claim 1 further including auto-brake fault light means energized by said arming switch means when said arming switch is in the disarm position.

3. The system according to claim 1 wherein input logic for said first arming circuit is a function of primary landing gear air/ground logic and input logic for said second arming circuit is a function of alternate landing gear air/ground logic.

4. The system according to claim 1 further including fault detector logic circuit means responsive to one or more of a plurality of fault conditions in said auto-brake system for providing an input to said first and second arming circuits a predetermined time period subsequent to the occurrence of a fault condition.

5. The system of claim 1 further including wheel speed spin-up detector circuit means for providing a spin-up signal when the average of a plurality of front wheels of said aircraft exceeds a predetermined speed, and means for coupling said spin-up signal to said ON-RAMP COMMAND logic circuit.

6. the system of claim 4 further including wheel speed spin-up detector circuit means for providing a spin-up signal when the average of a plurality of front wheels of said aircraft exceeds a predetermined speed, and means for coupling said spin-up signal to said fault detector logic circuit means.

* * * * *